United States Patent [19]

Gartner

[11] Patent Number: 4,715,044
[45] Date of Patent: Dec. 22, 1987

[54] AUTOMATIC SYNCHRONOUS/ASYNCHRONOUS MODEM

[75] Inventor: William J. Gartner, Red Bank, N.J.

[73] Assignees: American Telephone & Telegraph Company, New York, N.Y.; AT&T Information Systems Inc., Morristown, N.J.

[21] Appl. No.: 881,721

[22] Filed: Jul. 3, 1986

[51] Int. Cl.$^4$ .............................................. H04L 27/02
[52] U.S. Cl. ...................................... 375/8; 375/111; 375/117; 379/93; 379/97
[58] Field of Search ............... 370/41, 43, 49; 375/7, 375/8, 9, 117, 36, 106, 111; 178/3, 2 B, 4.1 B, 26 A; 379/93, 94, 96, 97, 98; 371/47, 49; 340/825.14, 825.62

[56] References Cited

U.S. PATENT DOCUMENTS

| | | | |
|---|---|---|---|
| 3,139,607 | 6/1964 | Grondin | 375/111 |
| 3,961,138 | 6/1976 | Fellinger | 375/111 |
| 4,007,421 | 2/1977 | Lien | 375/111 |
| 4,035,580 | 7/1977 | Dieter | 370/41 |
| 4,079,188 | 3/1978 | Kinch, Jr. et al. | 370/41 |
| 4,542,517 | 9/1985 | Goss et al. | 375/36 |
| 4,586,159 | 4/1986 | Thomas et al. | 371/47 |

OTHER PUBLICATIONS

Data Set 212A Interface Specification, PUB41214, Publisher's Data Center Incorporated, P.O. Box C738, Pratt Street Station, Brooklyn, New York.

*Primary Examiner*—Benedict V. Safourek
*Attorney, Agent, or Firm*—David H. Tannenbaum

[57] ABSTRACT

There is disclosed an arrangement which enables a single modem port to be used for either synchronous or asynchronous data transmission, with no manual changes required. The modem determines whether the incoming call is synchronous or asynchronous by detecting the presence (or absence) of SYNC characters in the data stream immediately after handshaking. Once a determination has been made, the modem options itself accordingly for synchronous or asynchronous data handling. This arrangement eliminates the need for separate central office lines for synchronous and asynchronous data applications.

12 Claims, 10 Drawing Figures

W = 01110111

J = 01101010

G = 01100111

| 11001110 | 11111111 | 11111111 | 11100110 | 10101100 | 11001111 | 111111.. |

FIG. 7

| 10xxxxxx | xx10xxxx | xxxx10xx | xxxxxx10 | xxxxxxxx | 10xxxxxx | xx1 |

```
10xxxxxx = SAMPLE [1]
xx10xxxx = SAMPLE [2]
xxxx10xx = SAMPLE [3]
xxxxxx10 = SAMPLE [4]
xxxxxxxx = SAMPLE [5]
```

FIG. 8

0xxxxxxx 110xxxxxxx 110xxxxxxx 110xxxxxxx 110xxxxxxx11

START BIT / STOP BITS    EACH x IS INDEPENDENT, AND MAY ASSUME ANY VALUE (0 OR 1)

FIG. 9

```
0xxxxxxx
x110xxxx
xxxx110x
xxxxxxx1
10xxxxxx
xx110xxx
xxxxx110
xxxxxxxx
110xxxxx
xxx110xx
xxxxxx11
0xxxxxxx
  . .
```

FIG. 10

01111110011111100111101111100110100100111101111111001111110011111100111111001...
| SYNC || SYNC || M || SYNC || J || G || SYNC || SYNC || SYNC |

AUTOMATIC SYNCHRONOUS/ASYNCHRONOUS MODEM

BACKGROUND OF THE INVENTION

This invention relates to a transmission system adapted for both synchronous and asynchronous data transmission and more specifically to a circuit for automatically adapting to the proper transmission mode.

A modem is a device used at the receiving and transmitting ends of a telephone line to process data transmission over that line. Data moving through the modem can be either synchronous, meaning that data characters are transmitted at a fixed rate, with the transmitter and receiver synchronous or asynchronous, meaning that time intervals between transmitted characters may be of unequal length.

A host computer that provides dial-up facilities for both asynchronous applications (e.g., data from a remote terminal), and synchronous applications (e.g., file transfer data from another host computer) would ordinarily have one modem port for asynchronous data and a separate modem port reserved for synchronous data.

Typically, each modem port of the host computer would receive data on a separate communication line from the telephone switching office. In certain applications, however, data traffic for each port is of sufficiently low volume that the cost of a separate communication line and modem cannot be justified. Modems are designed with options to handle either synchronous data or asynchronous data but not both. Thus, using present modem designs (some have a manual switch for converting from one mode to another), the desired result of using a single communication line for different data types is not achievable.

SUMMARY OF THE INVENTION

I have designed a modem which can be used for both synchronous and asynchronous data and which will automatically adapt to the type of data (synchronous or asynchronous) being transmitted at the beginning of a call. I have relied upon the typical handshaking sequence between modems which is presently used to establish data rate. One example of such a modem is shown in Data Set 212A Interface Specification, PUB41214, obtainable from AT&T Customer Information Center P.O. Box. 19901, Indianapolis, Indiana 46219 (1-800-432-6600), which reference is hereby incorporated by reference herein. This reliance is founded on the critical fact that the handshaking sequence does not depend upon the nature of the data being transmitted (i.e., synchronous or asynchronous). Thus, prior to establishing the nature of the data transmission, it is possible to perform the handshaking function without the modem being configured for either data type.

After the handshaking sequence, the newly designed modem examines the actual data transmission for a prescribed amount of time and decides, based upon the content of the actual data received, whether the data is asynchronous or synchronous.

I have taken advantage of the different data characteristics between synchronous and asynchronous data by designing a modem to examine, in increments, for a fixed period of time, the actual transmitted data. If a certain number of consecutive increments are found to be equal, during that time the data is assumed to be synchronous. If the timed interval (five seconds in one case) elapses and the data does not appear to be synchronous, the modem assumes the asynchronous mode. The reasons for these assumptions will be discussed in more detail hereinafter.

BRIEF DESCRIPTION OF THE DRAWINGS

These and other objects and features, together with the operation and utilization of the present invention, will be more apparent from the illustrative embodiment shown in conjunction with the drawings in which FIGS. 4 through 10 show data sequences used for control.

DETAILED DESCRIPTION

Figure 1:
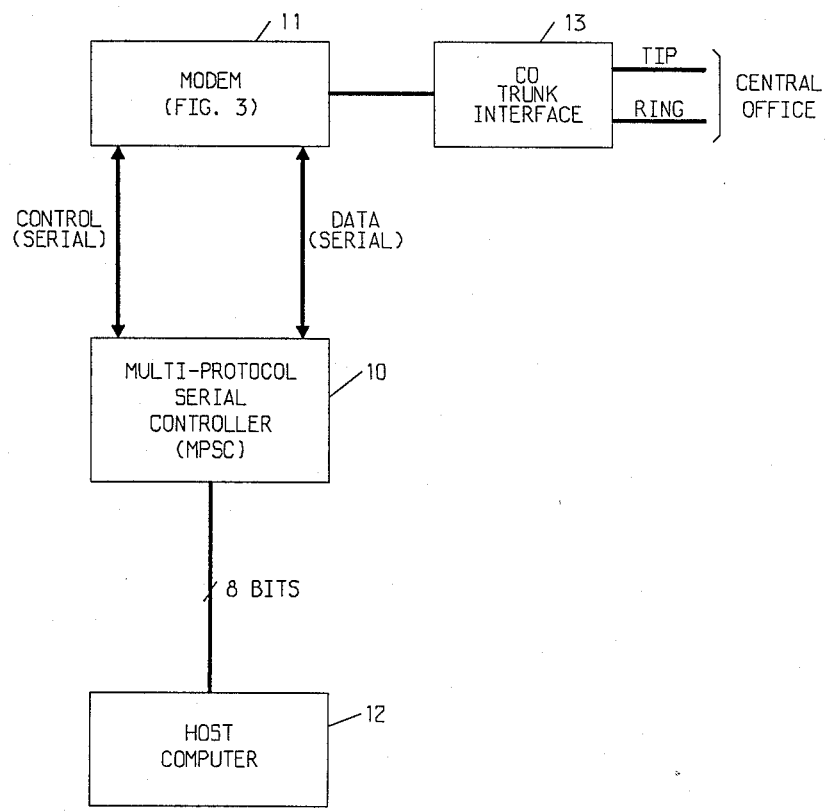
FIG. 1 shows a modem as used in a system.

As shown in FIG. 1, host computer 12 communicates over the central office line via co-trunk interface 13, modem 11 and multi-protocol serial controller 10. Prior to discussing the operation of modem 11, it will be helpful to note that the communication line can be any line requiring modem intervention.

Using the embodiment shown in FIG. 1, host computer 12 communicates with modem 11 via a serial control channel. When modem 11 has completed the handshake sequence with the remote modem (not shown) at the far end of the communication connection, it then, as will be discussed, determines the nature of the data and transmits a control message via multi-protocol serial converter 10 to host computer 12. Host computer 12 then completes the connection to either an internal asynchronous process or to an internal synchronous process. In addition, the modem options itself to handle asynchronous (start/stop) data or synchronous data.

Figure 2:
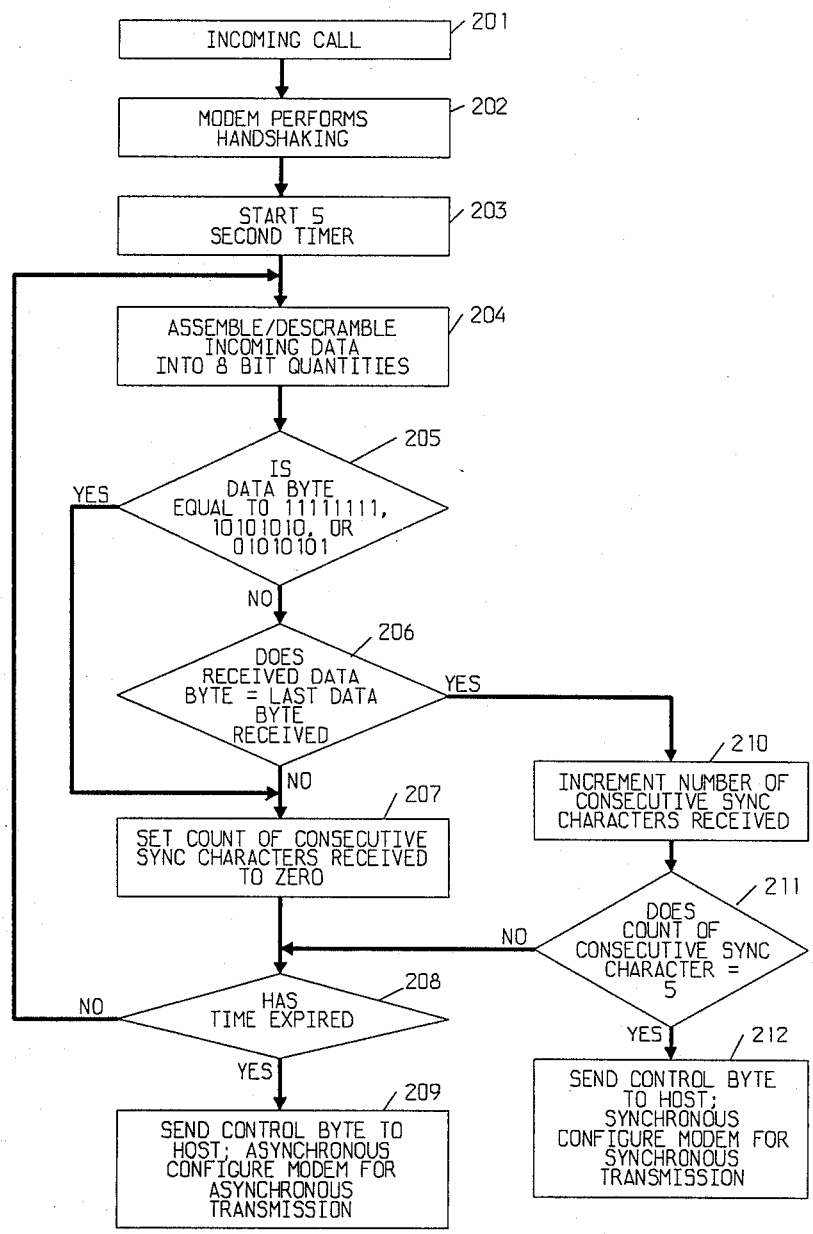
FIG. 2 is a flow chart of the control sequence used.

As shown in FIG. 2, at the completion of the handshaking routine (box 202), a 5 second timer is started (box 203). During this time, the incoming data is assembled and descrambled into five consecutive 8-bit quantities (box 204). Box 205 separates possible valid synchronous data from possibly asynchronous data. Boxes 205 and 210 through 212 control the situation where five consecutive 8-bit increments occur within the 5 second timed interval. Boxes 206–208 control the opposite situation.

If modem 11 encounters five consecutive 8-bit matches, it will option itself for synchronous transmission. If 5 seconds elapse and five consecutive matches have not occurred, the modem will option itself for asynchronous transmission.

Note that, as shown in box 205, the following 8-bit bytes do not qualify as SYNC characters: 11111111, 10101010, 01010101. The reason for this will be discussed thereafter.

Figure 3:
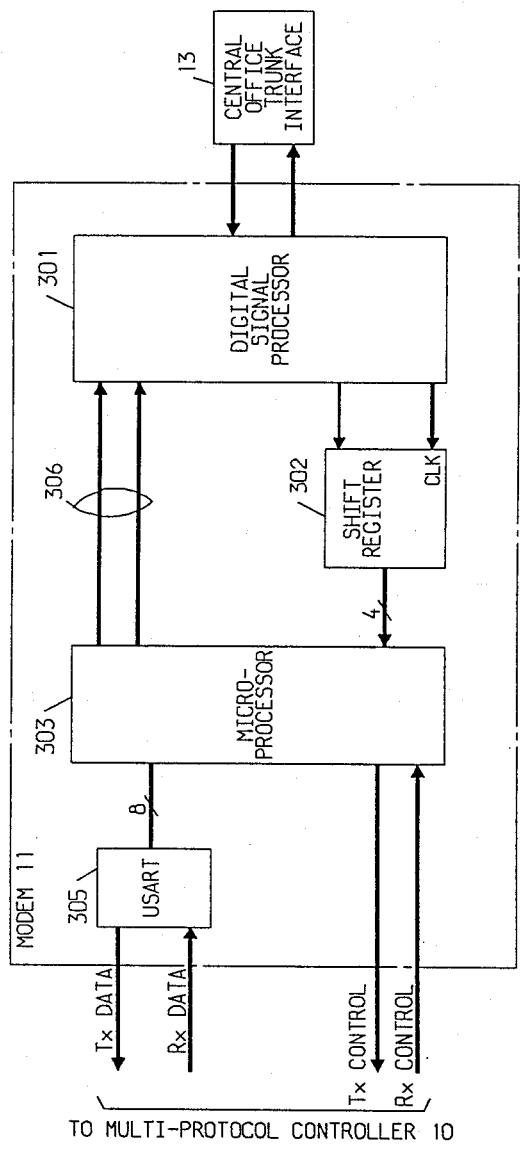
FIG. 3 shows details of the modem.

Turning now to FIG. 3, modem 11 consists of digital signal processor (DSP) 301, microprocessor 303 (which can be an Intel 8051 microprocessor), universal synchronous/asynchronous receiver/transmitter (USART) 305 (which can be an Intel 8251A USART) and shift register 302. DSP 301 is responsible for performing the demodulation function on pulse code modulation (PCM) samples received from CO trunk interface circuit 13. In addition, DSP 301 performs the modulation function on data arriving from microprocessor 303.

Clock signals are recovered by DSP 301 in the traditional manner from the received data and are provided to microprocessor 303. Microprocessor 303 communicates with DSP 301 via leads 306 to pass data from microprocessor 303 to DSP 301. DSP 301 connects to shift register 302, to control the passage of data to microprocessor 303. Microprocessor 303 is responsible for passing data between DSP 301 and host computer 12 (FIG. 1), via USART 305. In addition, microprocessor 303 monitors the data stream and takes action when, as will be discussed in more detail, certain data conditions occur. In addition, microprocessor 303 handles all handshake sequencing and timing with the remote end modem in the manner well-known in the art, as shown, for example, the aforementioned Data Set 212A Interface Specification. Finally, microprocessor 303 communicates with host computer 12 over a separate control serial link.

Data Transmission

For discussion purposes, we shall define a baud interval as the time between phase changes on a transmission line. A modem operating at 1200bps has baud intervals approximately once every 1.66 msec. During each such baud interval, 2 bits (dibit) are received from the far end, which is central office trunk interface 13 in this example. When four dibits are received by microprocessor 303, they are stored in an internal RAM (not shown, but part of microprocessor 303) and compared to the previous 8-bit stored sample. If the two samples are equal and are not one of the following: 11111111,10101010,01010101, a sync counter, internal to microprocessor 303, is incremented. If the two samples are not equal, the new sample replaces the old sample, and the sync counter is cleared. If the sync counter equals 5, a message is sent via the control serial link to the host computer that synchronous data is being received. If 5 seconds expire and the sync counter does not equal 5, a message is send via the control serial link to the host computer that asynchronous data is being received.

Figures 4, 5, 6:
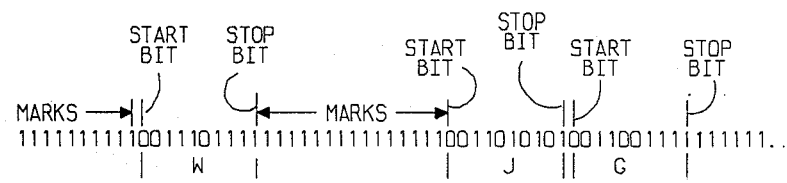

The reason for the assumptions concerning asynchronous and synchronous data is shown with respect to FIGS. 4 through 10. FIG. 4 shows three ASCII characters "wjg". These characters, as will be seen, can arrive in either synchronous or asynchronous format (but not both) during a transmission.

FIG. 5 is an example of an asynchronous character stream with the ASCII characters "wjg" as data.

Note that each character is delimited by a start bit (0) and a stop bit (1). When no characters are being transmitted, a mark (1) is transmitted. This is distinctly different from the general nature of synchronous data, as shown in FIG. 10, where bytes of synchronous data characters of fixed length (01111110) are transmitted when no data is being sent.

Returning to the asynchronous data stream shown in FIG. 5 and starting at any random bit position, we can partition the stream, as shown in FIG. 6, into 8-bit quantities beginning at that random bit. Unless five consecutive 8-bit quantities have the identical bit pattern, the data is assumed to be synchronous. As shown in FIG. 6, no two consecutive 8-bit quantities are equal except 11111111, which is not a candidate. Therefore, none of these bytes would cause the sync counter to increment even once. Thus, data that looks like this, i.e., bursty with multiple marks between characters, would never qualify for counting. This implies that the most likely time an asynchronous data stream might be mistaken by synchronous data is when data is being transmitted continuously with no marks between characters.

FIG. 7 illustrates a continuous stream of asynchronous data being transmitted with one stop bit. Sample [1] shows the result if we start out sample with a stop bit. The periodic pattern between samples [1] and [5], shown in FIG. 7, would emerge. In order for sample [1]=sample [2]=sample [3]=sample [4]=sample [5] (which is the synchronous condition), samples [1] through [5] must each equal 10101010. However, 10101010 is one of the data bytes declared to be non-determinative of the synchronous/asynchronous question (as shown in FIG. 2, block 205). Note that this pattern would emerge for any five consecutive samples independent of the starting bit position.

Similarly, a continuous stream of asynchronous characters with one start bit and two stop bits might appear as shown in FIG. 8. Starting at any bit position in the sequence, the periodic pattern, shown in FIG. 9, will emerge. Note that any five consecutive 8-bit bytes will have at least one bit position which will disqualify the sequence from being a valid sync sequence independent of the value of x.

As discussed above, FIG. 10 shows an example of synchronous character stream with ASCII characters "wjg" and the sync character =01111110. Note that when no characters are being transmitted sync characters are always being transmitted and there are no bits to delimit characters. If an 8-bit quantity is not a sync character, it is considered data. An important assumption is that at least five consecutive sync characters will be transmitted after the modem completes handshaking prior to the start of data transmission. At 1200bps this would take less than 50 milliseconds. Thus, it is certain that the continuous repetition of the sync character will result in a determination that the data is synchronous and this will occur no matter where in the data transmission counting is begun.

Conclusion

It should be noted that, using my concepts, the number of data bits within each data byte can be varied as well as the preset timed interval. Also, while this technique is shown for asynchronous and synchronous data, it can be used for any data type having similar data characteristics. Also, the receiving data device, the host computer in my example, could be set to default to a given transmission mode unless instructed otherwise by the modem device. In such a situation, only one signal need be given to the receiving device.

It also should be noted that, while I contemplate my circuit only operating at the beginning of each new transmission, this is not necessary, and my device could be arranged to continuously monitor the transmission and to provide signals upon any transmission mode change.

What is claimed is:

1. A circuit for interposition between a communication line and a processor, said communication line having data transmission thereon, said circuit comprising
    means for monitoring each new data transmission on said communication line for a preset interval at the start of said new data transmission,
    means operable under control of said monitoring means for detecting whether a particular new data transmission is in synchronous format or in asynchronous format, and
    means for providing a first signal when a new one of said data transmissions is detected as being synchronous and for providing a different signal when said new data transmission is detected as being asynchronous.

2. The invention set forth in claim 1 wherein said monitoring means includes means beginning with any data bit for breaking said monitored transmission into data bytes having n data bits each, means for comparing successive ones of said data bytes during said preset interval, means for counting successive ones of said data bytes which have all like data bits in the same relative positions within successive ones of said compared data bytes, and means for providing said first signal when said counting means reaches a preset number within said preset interval.

3. The invention set forth in claim 2 further comprising means for resetting said counting means upon detecting data bytes having certain preestablished ones of said data bit combinations.

4. The invention set forth in claim 3 wherein n equals eight.

5. The invention set forth in claim 1 wherein said transmission includes an initialization portion followed by an active data transmission portion, and wherein said preset interval occurs within the first 5 seconds of said transmission portion.

6. The invention set forth in claim 1 wherein said circuit further includes means for processing either said synchronous or said asynchronous data transmission, and means responsive to said signals for enabling said processing means.

7. The invention set forth in claim 1 further comprising means for providing said signals to said processor.

8. A signal processing device for use between data transmitting and data receiving devices, said signal processing device operable for controlling data transmissions between said data devices in either of two transmission modes, said modes characterized by data patterns within said transmission unique to said transmission mode, said signal processing device comprising means for establishing a preset interval, means for establishing a series of data bytes each said byte having n data bits, means for examining any said established bytes, means for comparing successive ones of said examined data bytes to determine if a certain preset number m of said compared data bytes are the same, and means for providing a first signal indicative of one of said transmission modes to a receiving data transmission device upon a determination that said preset number m of consecutive data bytes is the same within said preset interval.

9. The invention set forth in claim 8 wherein said number of data bits within each said data byte is 8 and wherein said establishing means begins with any said data bit in said transmission.

10. The invention set forth in claim 9 wherein said preset interval is 5 seconds at the beginning of each new transmission between data transmitting and receiving devices.

11. The invention set forth in claim 9 further comprising means for inhibiting the enabling of said providing means upon the detection of certain preestablished data bit combinations within said compared data byte.

12. The invention set forth in claim 8 wherein said device includes means for uniquely configuring said device to control data transmission in only one of said two modes, and means controlled by said first signal providing means for controlling said configuring means.

* * * * *